(No Model.)
J. B. MARQUIS.
DAIRY APPARATUS.
No. 267,237. Patented Nov. 7, 1882.
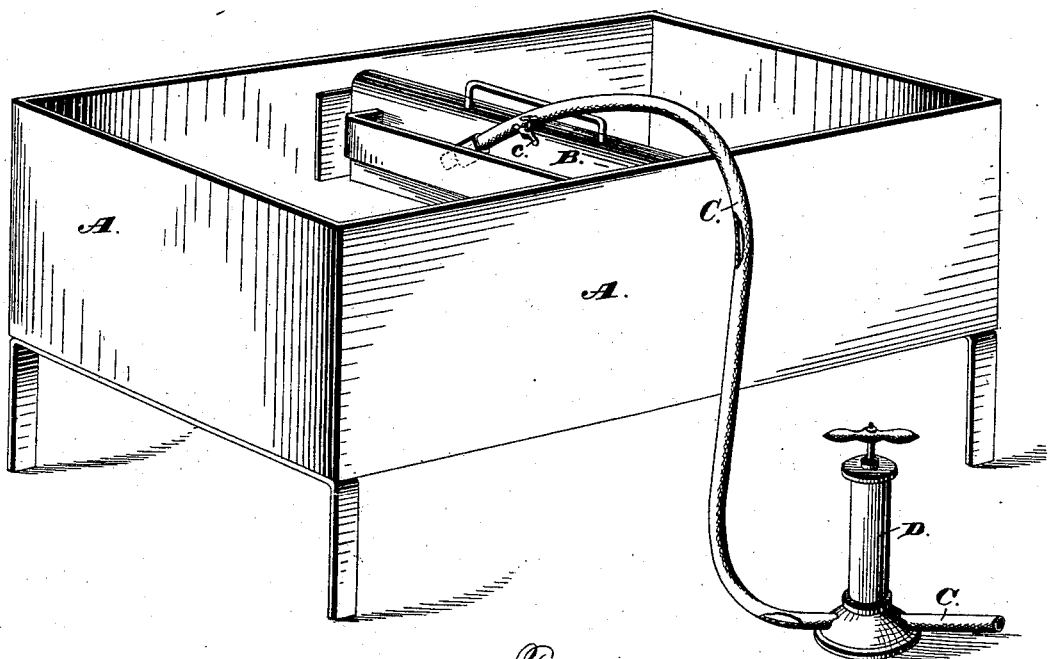
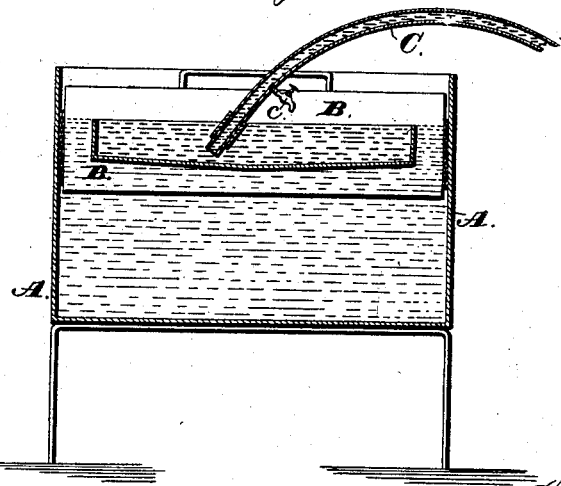
Witnesses:
Jas. E. Hutchinson.
Henry C. Hazard.
Inventor.
J. B. Marquis, by
Geo. S. Prindle, his Atty

UNITED STATES PATENT OFFICE.

JAMES B. MARQUIS, OF NORWICH, NEW YORK.

DAIRY APPARATUS.

SPECIFICATION forming part of Letters Patent No. 267,237, dated November 7, 1882.

Application filed July 31, 1882. (No model.)

*To all whom it may concern:*

Be it known that I, JAMES B. MARQUIS, of Norwich, in the county of Chenango, and in the State of New York, have invented certain new and useful Improvements in Dairy Apparatus; and I do hereby declare that the following is a full, clear, and exact description thereof, reference being had to the accompanying drawings, making a part of this specification, in which—

Figure 1 is a perspective view of my apparatus as used for removing and aerating the cream from a milk-vat, and Fig. 2 is a section of the same upon a line passing through the discharge-pipe.

Letters of like name and kind refer to like parts in each of the figures.

The design of my invention is to prepare cream for immediate churning while being removed from the surface of milk; and to this end it consists broadly in the method of removing cream from a milk-vat and preparing the same for immediate churning by forcing said cream by atmospheric pressure outward through a pipe and causing air to enter into and mingle with the same while passing through said pipe, substantially as and for the purpose hereinafter specified.

In the annexed drawings, A represents a milk-vat, and B a vessel for containing cream, which vessel is arranged in convenient position to receive cream from the surface of the milk within said vat, said cream being removed from said milk and placed within said vessel by any desired means. From the vessel B the cream is removed to a churn or other suitable receptacle through a pipe, C, by means of gravity or atmospheric pressure. When gravity alone is employed said pipe must extend downward from said vessel to said churn; but when atmospheric pressure is used a pump, D, is placed at some point on said pipe between its ends and operated in the usual manner, such mechanism permitting any desired relative arrangement of said vessel B and the receiving-vessel.

In order that the cream may be thoroughly aerated during its passage through the pipe C, and thus prepared for immediate use in the churn, a stop-cock, $c$, is inserted within said pipe near its inlet end, and through the same air in any desired quantity is permitted to enter said pipe. The motion of the cream through the pipe C operates to draw air inward through the stop-cock $c$, which air, entering at a right angle to the current of cream, is thoroughly and completely mixed with and brought into contact with each particle of the same, the result being their complete aeration. It is found that the best result is secured when the pipe C has a length of about sixty feet, the contact of the cream with the air during the time necessary for their passage through such length of pipe being sufficient to cause perfect aeration.

Cream treated in the manner described is ready for immediate churning, and will not only produce a maximum of butter, but the product will have a better color and flavor than can be secured otherwise, and will keep longer without injury than the best butter churned from cream treated in the usual manner.

I am aware that mechanism has before been used in which air was forced into cream for the purpose of operating mechanically in the production of butter in place of the dasher usually employed for such purpose, and therefore do not claim broadly the introduction of air into cream.

Having thus fully set forth the nature and merits of my invention, what I claim as new is—

Broadly, the method of removing cream from a milk-vat and preparing the same for immediate churning by forcing said cream by atmospheric pressure to pass outward through a pipe, and causing air to enter into and mingle with the same while passing through said pipe, substantially as and for the purpose specified.

In testimony that I claim the foregoing I have hereunto set my hand this 12th day of June, 1882.

JAMES B. MARQUIS.

Witnesses:
WARREN NEWTON,
CHAS. B. CANNON.